United States Patent
Taneyhill et al.

(10) Patent No.: US 10,118,597 B2
(45) Date of Patent: Nov. 6, 2018

(54) PARKING BRAKE CONTROLLER AN METHOD TO MAINTAIN A TRAILER AIR SUPPLY

(71) Applicant: Bendix Commercial Vehicle Systems LLC, Elyria, OH (US)

(72) Inventors: David J Taneyhill, Elyria, OH (US); Thomas S Miller, Jr., Lagrange, OH (US); Timothy Carritte, Avon Lake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 372 days.

(21) Appl. No.: 14/928,125

(22) Filed: Nov. 18, 2015

(65) Prior Publication Data
US 2017/0137002 A1    May 18, 2017

(51) Int. Cl.
| | |
|---|---|
| *B60T 8/17* | (2006.01) |
| *B60T 15/02* | (2006.01) |
| *B60T 7/20* | (2006.01) |
| *B60T 15/04* | (2006.01) |
| *B60T 15/22* | (2006.01) |

(52) U.S. Cl.
CPC .............. *B60T 8/1708* (2013.01); *B60T 7/20* (2013.01); *B60T 15/04* (2013.01); *B60T 15/223* (2013.01)

(58) Field of Classification Search
CPC ........ B60T 7/20; B60T 8/1708; B60T 13/263; B60T 13/268; B60T 13/662; B60T 15/04; B60T 15/223; B60T 15/027; B60T 17/221; B60T 2220/00
See application file for complete search history.

(56) References Cited

U.S. PATENT DOCUMENTS

| | | | | |
|---|---|---|---|---|
| 4,586,584 | A * | 5/1986 | Auman | B60T 13/263 180/271 |
| 5,485,141 | A | 1/1996 | Gregory | |
| 5,675,190 | A * | 10/1997 | Morita | B60R 25/08 180/287 |
| 6,685,281 | B2 * | 2/2004 | MacGregor | B60T 7/10 303/123 |
| 7,568,577 | B2 | 7/2009 | Geither | |
| 8,079,649 | B2 | 12/2011 | Eberling | |
| 8,795,136 | B2 | 8/2014 | Bensch | |
| 2004/0113811 | A1 | 7/2004 | Waszkowski | |
| 2004/0124697 | A1 * | 7/2004 | MacGregor | B60T 17/08 303/89 |

(Continued)

OTHER PUBLICATIONS

Bendix Commercial Vehicle Systems LLC "Bendix MV-3 Dash Control Module," SD-03-3415 Service Data Sheet, Mar. 2012, 8 pages, Bendix Commercial Vehicle Systems LLC, Elyria Ohio USA.

*Primary Examiner* — Thomas G Black
*Assistant Examiner* — Ce Li Li
(74) *Attorney, Agent, or Firm* — Cheryl L. Greenly; Brian E. Kondas; Eugene E. Clair (57) ABSTRACT

A controller for a parking brake system for a commercial vehicle is disclosed. The controller receives a signal indicative of a request to park a tractor, a signal indicative of a request to supply air to a trailer and a signal indicative of a vehicle operating condition. The controller transmits a control signal to a tractor parking brake device and a trailer air supply device in order to park the tractor and maintain the air supply to the trailer to suspend the parking of the trailer in response to the signals.

32 Claims, 3 Drawing Sheets

(56) References Cited

U.S. PATENT DOCUMENTS

| | | |
|---|---|---|
| 2008/0143179 A1 | 6/2008 | Rutherford |
| 2009/0099746 A1 | 4/2009 | Hilberer |
| 2009/0198427 A1* | 8/2009 | Jackson .................. B60T 7/122 |
| | | 701/70 |
| 2009/0314590 A1 | 12/2009 | Dagh |
| 2011/0022283 A1 | 1/2011 | Lovell |
| 2011/0147142 A1* | 6/2011 | Standen .................... B60T 7/20 |
| | | 188/152 |
| 2014/0116812 A1 | 5/2014 | Simpson |

* cited by examiner

PARKING BRAKE CONTROLLER AN METHOD TO MAINTAIN A TRAILER AIR SUPPLY

BACKGROUND

The present invention relates to embodiments of a parking brake controller and method to maintain an air supply to a trailer, such as a trailer used in an air braked commercial vehicle. In a parking brake system for an air braked vehicle, the driver pushes a dash mounted tractor park switch when he wants to release the parking brake of the tractor. The driver pushes the dash mounted trailer supply switch when he wants to supply air to the trailer. Supplying air to the trailer will release the parking brakes of the trailer. The driver pulls the tractor park switch when he wants to release air from the parking brake actuators to apply the parking brakes of the tractor. The driver pulls the trailer supply switch when he wants to evacuate air from the trailer air supply to apply the parking brakes of the trailer. In a multi-function valve, such as the MV-3® dash control module from Bendix Commercial Vehicle Systems LLC, the supply air to the trailer is automatically evacuated when the air is released from the parking brake actuators of the tractor. Therefore, the parking brakes of the trailer are applied at approximately the same time as the tractor. However, there are situations when the driver may want to maintain the air supply to the trailer to keep the parking brakes of the trailer released even after the tractor parking brakes are applied.

SUMMARY

Various embodiments of a controller for a parking brake system for a commercial vehicle are disclosed. The controller comprises a first input for receiving a signal indicative of a request to park a tractor, a second input for receiving a signal indicative of a request to supply air to a trailer. The controller also comprises a first output for transmitting a tractor park control signal and a second output for transmitting a trailer supply control signal. The controller comprises control logic for transmitting a trailer supply control signal to maintain the trailer air supply in response to the signal indicative of the request to supply air to the trailer being received prior to the signal indicative of a request to park the tractor; and transmitting a tractor park control signal in response to the signal indicative of a request to park the tractor.

In accordance with another aspect, a system for parking brake control for a vehicle comprises a tractor park switch, a trailer supply switch, a tractor parking brake device, a trailer supply device and a controller. The controller comprises a first input for the receiving a state of the tractor park switch, a second input for receiving a state of the trailer supply switch, a communications input for receiving a vehicle operating condition and control logic. The control logic is capable of receiving a state of the tractor park switch, receiving a state of the trailer supply switch, receiving a signal indicative of vehicle operating condition and transmitting a control signal to the tractor parking brake device to park the tractor and transmitting a control signal to the trailer supply device to maintain the air supply to the trailer in response to the vehicle operating condition meeting a predetermined operating condition, the tractor park switch being in a second state and the trailer supply switch being in a first state.

In accordance with another aspect, a method of maintaining a trailer air supply is disclosed. The method comprises actuating a trailer supply switch to maintain the trailer parking brake in a released state, actuating a tractor park switch to park a tractor subsequent to the actuation of the trailer supply switch and maintaining the trailer air supply and parking the tractor in response to actuating the trailer supply switch and actuating the tractor park switch.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
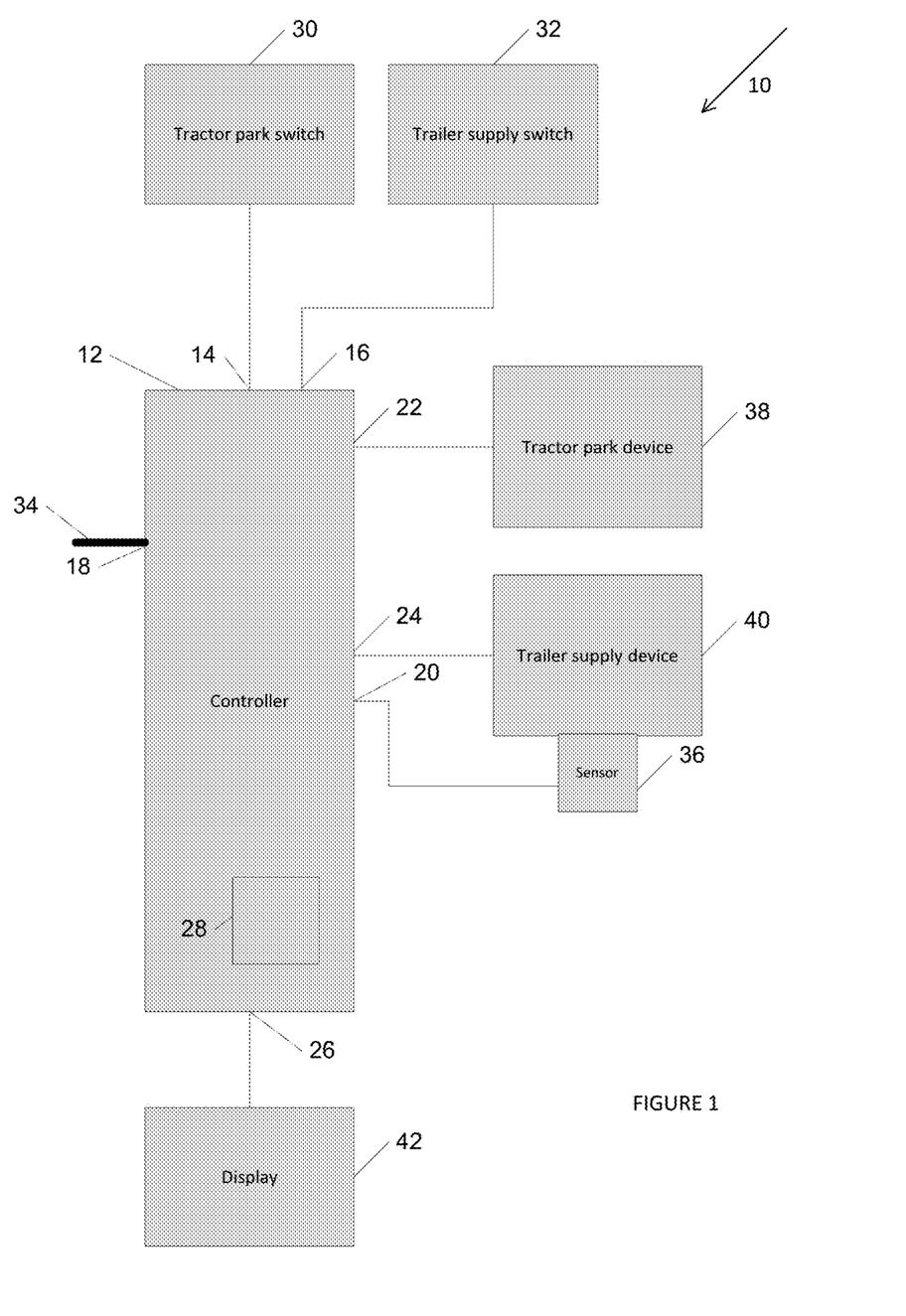
FIG. 1 illustrates a parking brake system on a tractor according to an example of this invention.

FIG. 1 illustrates a parking brake system 10 on a tractor for use with an air braked commercial vehicle. The parking brake system 10 may be an electronic parking brake system. The parking brake system 10 includes a tractor park switch 30. The tractor park switch 30 is located in the dash of the vehicle. The driver changes the state of the tractor park switch 30 to indicate that he wants to apply or release the parking brakes of the tractor. The tractor park switch 30 may be a three state electric switch. For example, the driver pulls out the tractor park switch 30 to indicate that he wants to apply the tractor parking brakes, the driver pushes in the tractor park switch 30 to indicate that he wants to release the tractor parking brakes and the driver leaves the tractor park switch 30 in a neutral state to indicate that he wants the tractor parking brakes to remain in the current state. The tractor park switch 30 transmits a signal indicative of the driver's request to either apply the parking brakes of the tractor or to release the parking brakes of the tractor.

The parking brake system 10 includes a trailer supply switch 32. The trailer supply switch 32 is also located in the dash and generally proximate to the tractor park switch 30. The driver changes the state of the trailer supply switch 32 to indicate that he wants to supply air to or evacuate air from the air supply system to the trailer, which also supplies air to the trailer parking brake system. The trailer supply switch 32 may be a three state electric switch. For example, the driver pulls out the trailer supply switch 32 to indicate that he wants to apply the trailer parking brakes, the driver pushes in the trailer supply switch 32 to indicate that he wants to supply air to the trailer to release the trailer parking brakes and the driver leaves the trailer supply switch 32 in the neutral state to indicate that he wants the trailer parking brakes to remain in the current state. The trailer supply switch 32 transmits a signal indicative of the driver's request to either apply the trailer parking brakes or release the parking brakes of the trailer.

The parking brake system 10 includes a tractor park device 38. The tractor park device 38 may be an electropneumatic device that applies air to the tractor parking brake actuators in response to a control signal, thereby releasing the parking brakes, or exhausts air to the parking brake actuators in response to a control signal, thereby applying the parking brakes.

The parking brake system 10 includes a trailer supply device 40. The trailer supply device 40 may be an electro-pneumatic device that permits supply air to be transmitted to the trailer in response to a control signal, thereby releasing the parking brakes, or exhausts air in response to a control signal, thereby applying the parking brakes. The trailer supply device 40 may also include a pressure sensor 36 located on the trailer supply device 40 or the pressure sensor 36 may be in pneumatic communication with the supply air to the trailer supply device 40. The pressure sensor 36 measures the supply air pressure delivered to the trailer supply device 40 and transmits a signal indicative of the supply air pressure.

The parking brake system 10 may also include a feedback device, such as display 42, used by the driver to receive information regarding the state of the parking brake system 10. The display 42 may be a lamp or other indicator in the dash. The display 42 may be a driver information system that collects and displays information about the parking brake system 10 as well as other systems on the vehicle.

The parking brake system 10 includes a controller 12. The controller 12 receives signals from the tractor park switch 30 and the trailer supply switch 32, as well as signals regarding the vehicle operating condition. The controller 12 controls the tractor park device 38 and the trailer air supply device 40 to change the parking brake status of the tractor and the trailer. The controller 12 may also include functionality to control the anti-lock braking system, the stability system or the engine system on the vehicle.

The controller 12 includes several inputs. A first input 14 receives a signal indicative of a request to park a tractor from the tractor park switch 30. A second input 16 receives a signal indicative of a request to supply air to a trailer from the trailer supply switch 32.

A third input 18 receives a signal indicative of the vehicle operating condition. The third input 18 may be a discrete input from a sensor on the vehicle or may be an input compatible with a vehicle serial communications bus 34, such as SAE J1939. The third input 18 receives information about the vehicle operating condition such as vehicle speed, ambient temperature, inclination of the vehicle, temperature of the trailer brakes and foot brake valve actuation.

The controller 12 may include a pressure input 20 for receiving a trailer supply pressure signal from the pressure sensor 36. Alternatively, a trailer supply pressure value may be received via the serial communications bus 34.

The controller 12 includes several outputs. A first output 22 transmits a control signal to the tractor parking brake device 38. The control signal will place the tractor parking brake device 38 in either a supply air mode or an exhaust air mode. A second output 24 transmits a control signal to the trailer supply device 40. The control signal will place the trailer supply device 40 in either a supply air mode or an exhaust air mode. The controller 12 may include a third output 26 for transmitting a signal to the display 42.

The controller 12 includes control logic 28. The control logic 28 receives signals from the first input 14, the second input 16, the third input 18 and the pressure input 20 to control the parking brake state of the tractor and trailer through control signals transmitted to the first output 22 and the second output 24. The control logic 28 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 28.

Therefore, a controller for a parking brake system for a commercial vehicle comprises a first input for receiving a signal indicative of a request to park a tractor, a second input for receiving a signal indicative of a request to supply air to a trailer and a third input for receiving a signal indicative of the vehicle operating condition. The controller also comprises a first output for transmitting a control signal to a tractor parking brake device and a second output for transmitting a control signal to a trailer air supply device and control logic for controlling the state of the tractor parking brakes and the trailer parking brakes.

Therefore, a system for parking brake control for a vehicle comprises a tractor park switch, a trailer supply switch, a tractor parking brake device, a trailer supply device and a controller. The controller comprises a first input for the receiving a state of the tractor park switch, a second input for receiving a state of the trailer supply switch, a communications input for receiving a vehicle operating condition and control logic. The control logic is capable of receiving a state of the tractor park switch, receiving a state of the trailer supply switch, receiving a signal indicative of vehicle operating condition and activating the tractor parking brake device. The control logic will suspend a signal to the trailer supply device in response to the vehicle operating condition, the tractor park switch being in a second state and the trailer supply switch being in a first state to maintain the air supply to the trailer.

Figure 2:
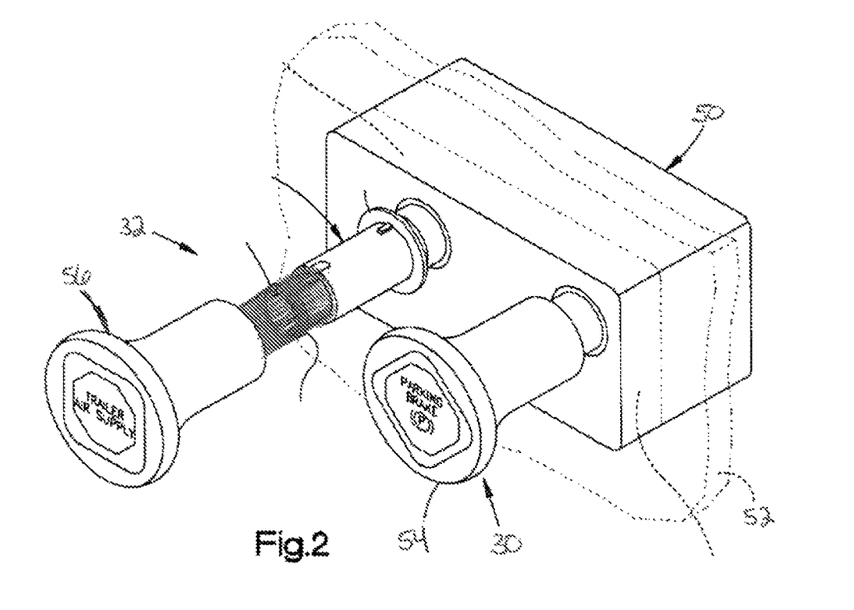
FIG. 2 illustrates a trailer supply switch and a tractor park switch according to an example of this invention.

FIG. 2 illustrates a switch module 50 having tractor park switch 30 and trailer supply switch 32. The switch module 50 is shown as installed in a dash 52. For this switch module 50, the tractor park switch 30 has a handle 54 that is capable of being pulled out by a driver when the driver wants to actuate the tractor park brakes. The trailer supply switch 32 also includes a handle 56. The handle 54 and handle 56 are marked, colored or shaped to differentiate the trailer supply switch 32 from the tractor park switch 30.

The tractor park switch 30 and trailer supply switch 32 may be three state switches. For example, the tractor park switch 30 can be moved into a first state, which is a pushed in position, a second state, which is a pulled out position and a third state, which is a neutral position. The tractor park switch 30 is shown in the neutral position in FIG. 2. In order to release the tractor parking brakes, the driver actuates the tractor park switch 30 by pushing in on the handle 54. Pushing in on the handle 54 transmits a signal to the controller 12 at input 14 indicating that the handle 54 has been pushed in and the driver desires to release the tractor parking brakes. The handle 54 may automatically return to the neutral position when the driver removes the force used to push in the handle 54. Alternatively, the handle 54 may remain in the pushed in position so the driver has a visual indication that the tractor park brakes are released. The handle 54 will remain in the pushed in position until the driver moves the handle 54 to the pulled out position.

The driver actuates the tractor park switch 30 by pulling out on the handle 54. Pulling out on the handle transmits a signal to the controller 12 at the input 14 indicating that the handle 54 has been pulled out and the driver desires to apply the tractor parking brakes. The handle 54 may automatically return to the neutral position when the driver removes the force used to pull out the handle 54. Alternatively, the handle 54 may remain in the pulled out position so the driver has a visual indication that the tractor park brakes are applied.

The trailer supply switch 32 can moved into a first state, which is a pushed in position, a second state, which is a pulled out position and a third state, which is a neutral position. The trailer supply switch 32 is shown in the pulled out position in FIG. 2. The driver will pull out on the handle 56 when he desires to release air from the trailer supply and thereby park the trailer. Pulling out on the handle 56 transmits a signal to the controller 12 at input 16 indicating that the handle 56 has been pulled out and the driver desires to release air from the trailer supply. The handle 56 may automatically return to the neutral position when the driver removes the force used to pull out the handle 56. Alternatively, the handle 56 may remain in the pulled out position so the driver has a visual indication that the trailer air supply is released. The handle 56 will remain in the pulled out position until the driver moves the handle 56 to the pushed in position.

The driver actuates the trailer supply switch 32 by pushing in the handle 56. Pushing in the handle 56 transmits a signal to the controller 12 at input 16 indicating that the handle 56 has been pushed in and the driver desires to supply air to the trailer. The handle 56 may automatically return to the neutral position when the driver removes the force used to push in the handle 56. Alternatively, the handle 56 may remain in the pushed in position so the driver has a visual indication that the trailer air supply is applied.

Alternatively, tractor park switch 30 and the trailer supply switch 32 may be rocker switches having three positions. From a neutral position (e.g. the third state), a rocker switch for the tractor park switch 30 may be pushed near the top to an engage park brakes position (e.g., the second state), and pushed near the bottom to a disengage park brakes position (e.g., the first state). In another example, the tractor park switch 30 and the trailer supply switch 32 may be twistable. From a neutral position (e.g. the third state), a twistable switch for the tractor park switch 30 may be twisted to the right to an engage park brakes position (e.g. the second state), and twisted to the left to a disengage park brakes position (e.g., the first state).

In switch module 50, the application of the trailer parking brakes at the same time as application of the tractor parking brakes may not be implemented in every instance, as will be described further.

Figure 3:
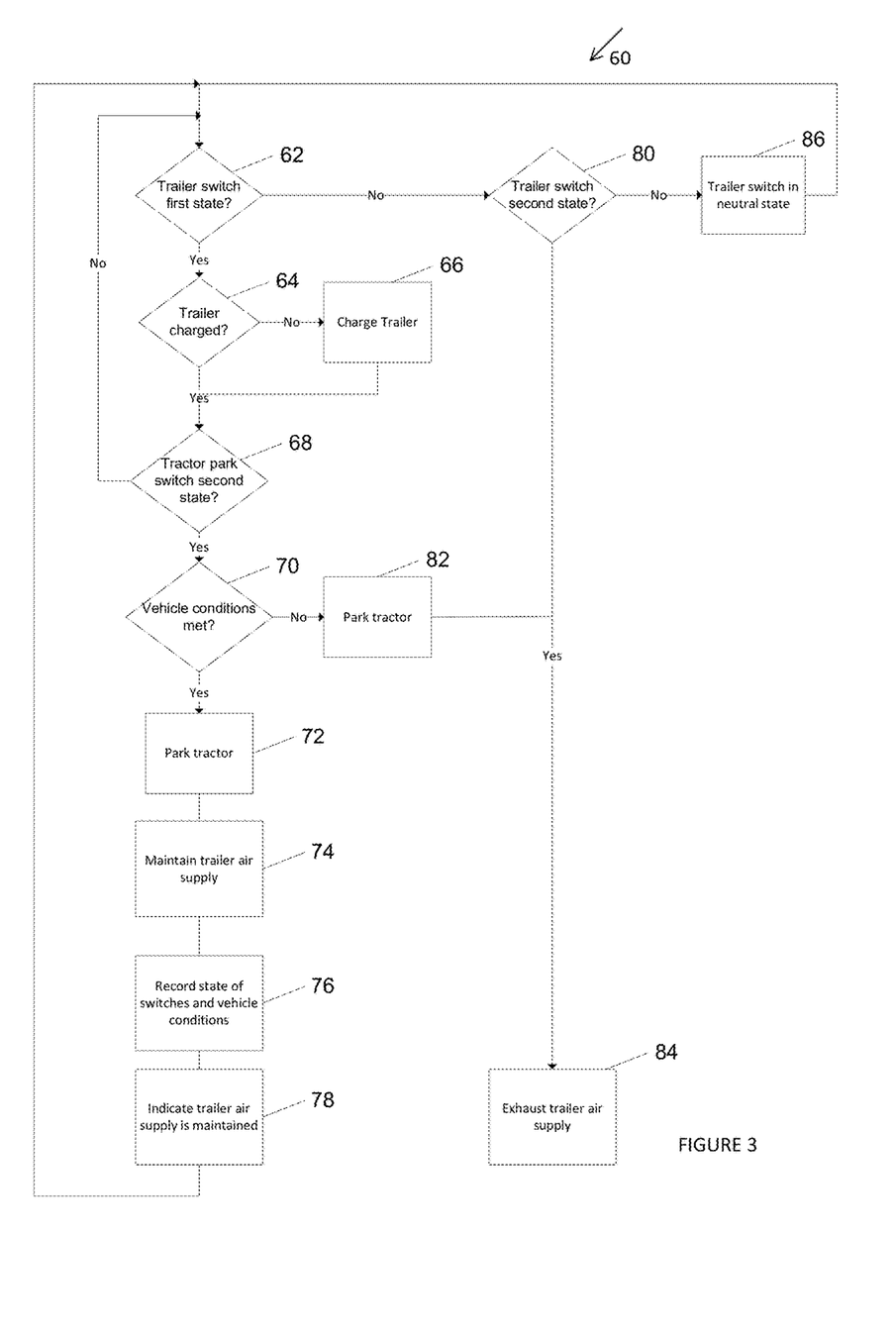
FIG. 3 illustrates a method of maintaining a trailer air supply according to an example of this invention.

FIG. 3 illustrates a method 60 for maintaining the air supply to the trailer by suspending the parking brake application of the trailer according to an example of the invention. The method 60 begins at step 62 when the position of the trailer supply switch 32 is determined. If the trailer supply switch 32 is in the first state, which is pushed in as an indicator of the driver desiring to supply air to the trailer, the method 60 proceeds to step 64.

At step 64, the control logic 28 determines if the trailer is already supplied with air. The control logic 28 can determine if the trailer is already supplied with air since the control logic 28 controls the state of the trailer supply device 40. If the trailer has not been supplied with air, the trailer air system is charged, or supplied with air, in step 66. The air supplied to the trailer also releases, or maintains the release of, the trailer parking brakes. The method 60 then proceeds to step 68. If the trailer air system was already charged, then the method proceeds to step 68.

In step 68, the state of tractor park switch 30 is determined by the control logic 28. If the tractor park switch 30 is in the second state, pulled out and indicating that the driver wants to park the tractor, the method 60 proceeds to step 70. If the tractor park switch 30 is in the first state or neutral position, the method 60 returns to step 62.

In step 70, the vehicle operating conditions are monitored by the control logic 28 to determine if any of the vehicle operating conditions meet the predetermined conditions. The signal indicative of the vehicle operating condition is received on input 18 of the controller 12. The vehicle operating conditions received may be, for example, a vehicle speed, an ambient temperature, a foot brake actuation, an inclination of the vehicle, and a trailer brake temperature. The predetermined conditions to be met may be the vehicle speed at or near zero, the ambient temperature less than a predetermined ambient temperature, the foot brake being actuated one or more times by the driver, the inclination on which the vehicle is located being less than about five degrees and the estimate of the temperature of the trailer brakes being less than a predetermined operating temperature. In one example, the predetermined ambient temperature is between about 30 F. and 40 F. In another example, the predetermined ambient temperature is about 32 F. In one example, the predetermined operating temperature at the trailer brakes is between about 60 F. and 150 F.

A vehicle operating condition may also be the trailer supply pressure as received from the pressure sensor 36 at input 20 of the controller 12. The predetermined condition may be the trailer supply pressure being greater than or equal a predetermined pressure. In one example, the predetermined pressure is between about 35 psi and about 65 psi. In another example, the predetermined pressure is about 45 psi. In another example, if the trailer supply pressure is less than 45 psi, the control logic 28 transmits a control signal to the tractor park device 38 to apply the tractor brakes in step 82 and then transmits a control signal to the trailer supply device 40 to exhaust the pressure as in step 84.

Certain combinations of vehicle operating conditions to be met can be set in the control logic 28. For example, the vehicle speed is at or near zero and the ambient temperature is less than about 32 F. in order for the vehicle operating conditions to be met in step 70. In another example, the foot brake is actuated by the driver and the operating temperature of the trailer brakes is greater than about 60 F. in order for the vehicle operating conditions to be met in step 70. In another example, the number of foot brake actuations has reached a minimum threshold amount since the last release of the trailer parking brakes, such as fifty brake applications. If any one of or combination of vehicle conditions as set in the control logic 28 are met in step 70, the method proceeds to step 72. If none of the vehicle conditions or combinations of vehicle conditions are met, the method continues to step 82.

In step 72, the control logic 28 transmits a control signal to the tractor park device 38 to apply the parking brakes by evacuating the air from the tractor parking brake system.

In step 74, the air supply to the trailer is maintained in response to the trailer supply switch 32 being in the first state in step 62, the tractor park switch being in the second state in step 68, and the vehicle condition(s) being met in step 70. The trailer air supply is maintained as the control signal sent by the control logic 28 to the trailer supply device 40 permits the trailer to be supplied with air. In this manner, the trailer is still receiving supply air from the tractor and the trailer parking brakes will not apply. In one example, a time period can be established for how long the trailer air supply is maintained after the tractor parking brakes are applied. As long as power is still supplied to the parking brake system 10, the time period can be measured from when the tractor parking switch 30 is moved to the second state. In one example, the time period is about two minutes. In another example, the time period that is allowed to elapse prior to the trailer air supply being exhausted is about five minutes.

In step 76, the state of the tractor park switch 30 and the state of the trailer supply switch 32 are recorded by the control logic 28 into a memory location. The vehicle conditions as received by the control logic 28 for the same time period are also recorded. In this manner, the control logic 28 maintains a record of the driver indicating that he consciously intended to maintain the trailer air supply to keep the trailer parking brakes released at the same time the tractor brakes are applied. The method continues to step 78.

In step 78, an indication of the trailer air supply being maintained is given to the driver by the control logic 28 via the output 26 to the display 42. The display 42 may also indicate that the tractor has been parked.

Returning to step 62, if the trailer supply switch 32 is not in the first state, the method proceeds to step 80 to determine if the trailer supply switch 32 is in the second state. If the trailer supply switch 32 is in the second state, pulled out indicating that the driver wants to exhaust the trailer air supply, the method 60 continues to step 84 to exhaust the trailer air supply.

If in step 80, the trailer supply switch 32 is not in the second state, the control logic determines the trailer supply switch 32 is in a neutral position. If the trailer supply switch 32 is in the neutral state, the method 60 returns to step 62 to continue to determine the state of the trailer supply switch 32.

Other means may be implemented to indicate that the driver desires to keep the trailer air supply maintained while the tractor parking brakes are applied. In one example, the trailer air supply may not be maintained unless the trailer supply switch 32 is moved to the first state at least two times within a predetermined time period of the tractor park switch 30 being moved to the second state. In another example, the trailer supply switch 32 has to be held in the first state for a predetermined period of time after the tractor park switch 30 is moved to the second state. In another example, the trailer supply switch 32 may be pushed in for a predetermined period of time and the tractor park switch 30 may be pulled out while the trailer supply switch 32 is still being pushed in. In another embodiment, a third switch (not illustrated) may be used to indicate that the driver desires to keep the trailer air supply maintained. When the third switch is activated, the driver needs only to pull out the tractor park switch 30 to indicate that he wants to park the tractor and the trailer parking brakes will remain released. Alternatively, a different action, such as twisting or squeezing, the trailer supply switch 32 may be used to indicate the desire to maintain the trailer parking brakes as released. In another example, the driver may push on the service brake pedal (not illustrated) one or more times prior to changing the states of the tractor park switch 30 to indicate that he intends for the trailer parking brakes to remain released even after he pulls the tractor park switch 30. All of these actions would be recorded by the control logic 28.

In the methods where the trailer supply switch 32 is actuated more than once or in a different manner, or a third switch is used, the vehicle condition may not need to be monitored as in step 70 since there is an additional indication that the driver wants to maintain the trailer air supply even when the tractor is parked.

Therefore, a method of maintaining a trailer air supply is disclosed. The method comprises actuating a trailer supply switch to transmit a signal indicative of a request to maintain the trailer parking brake in a released state, actuating a tractor park switch to transmit a signal indicative of a request to park a tractor subsequent to the actuation of the trailer supply switch, and maintaining a trailer air supply and parking the tractor in response to actuating the tractor park switch and actuating the trailer supply switch.

One reason for maintaining the trailer air supply after the tractor is parked as in the present method is to allow the trailer brakes to remain released to help mitigate any freezing of the trailer drum brake pads to the trailer drums. While a tractor generally has enough torque to overcome any ice formed between the brake pads and the drum, a trailer drum is fully exposed to atmosphere and has no power to force the pad away from the drum in after the ice has formed. If there is a delay between the tractor parking and the trailer parking, there is time for water to be dissipated from the localized freezing zones of the trailer brakes. Freezing of the trailer brakes while the trailer brakes are in the parked state causes problems, as the driver cannot easily release the trailer brakes from the frozen state without physically removing the ice through an external heat source or manual process.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller for a parking brake system for a commercial vehicle comprising:
    a first input for receiving a signal indicative of a request to park a tractor;
    a second input for receiving a signal indicative of a request to supply air to a trailer and release the trailer parking brakes;
    a first output for transmitting a tractor park control signal;
    a second output for transmitting a trailer supply control signal; and
    control logic, the control logic capable of
        transmitting a trailer supply control signal to maintain the trailer air supply and release of the trailer parking brakes in response to the signal indicative of the request to supply air to the trailer being received prior to the signal indicative of a request to park the tractor;
        transmitting a tractor park control signal in response to the signal indicative of a request to park the tractor and;
        transmitting the trailer supply control signal automatically to evacuate the trailer air supply in response to the signal indicative of the request to supply air to the trailer not being received prior to the signal indicative of the request to park the tractor.

2. The controller as in claim 1, further comprising: a third input for receiving a signal indicative of a vehicle operating condition; wherein the control logic is further capable of transmitting the trailer supply control signal to maintain the air supply to the trailer in response to the signal indicative of the vehicle operating condition.

3. The controller as in claim 2, wherein the control logic is further capable of: recording the signal indicative of a request to park a tractor; the signal indicative of a request to supply air to a trailer and the signal indicative of the vehicle operating condition meeting a predetermined condition.

4. The controller as in claim 1, further comprising a pressure input for receiving a signal indicative of a supply pressure value, wherein control logic is further capable of transmitting the trailer supply control signal to exhaust the trailer air supply to park the trailer in response to the supply pressure value being less than a predetermined pressure value.

5. A controller for a parking brake system for a commercial vehicle comprising:
   a first input for receiving a signal indicative of a request to park a tractor;
   a second input for receiving a signal indicative of a request to supply air to a trailer;
   a third input for receiving a signal indicative of the vehicle operating condition;
   a first output for transmitting a control signal to a tractor parking brake device;
   a second output for transmitting a control signal to a trailer air supply device; and
   control logic, the control logic capable of
      transmitting a control signal to the tractor parking brake device in response to the signal indicative of a request to park the tractor;
      transmitting a control signal to the trailer air supply device to maintain the trailer air supply to the trailer and the release of the trailer parking brakes in response to the signal indicative of the request to park the tractor being received subsequent to the request to supply air to the trailer, and the signal indicative of the vehicle operating condition meeting a predetermined condition, wherein the predetermined operating condition comprises the vehicle speed being about zero; and
      transmitting the control signal automatically to the trailer air supply device to evacuate the trailer air supply to the trailer in response to the signal indicative of the request to supply air to the trailer not being received prior to the signal indicative of the request to park the tractor.

6. The controller as in claim 5, wherein the third input is configured for receiving the signal indicative of the vehicle operating condition from a serial communications bus.

7. The controller as in claim 5, wherein the control signal to the trailer air supply device to maintain the trailer air supply is transmitted until at least one of a change in the signal indicative of the vehicle operating condition is received at the third input and a signal indicative of a request to evacuate the air supply to the trailer is received at the second input.

8. The controller as in claim 5, further comprising a pressure input for receiving a supply pressure at the trailer air supply device, wherein the trailer air supply device exhausts the trailer air supply to park the trailer in response to a supply pressure at the trailer supply valve being less than a predetermined pressure.

9. The controller as in claim 5, further comprising a third output for transmitting a signal indicative of the tractor being parked and the trailer air supply being maintained.

10. A controller for a parking brake system for a vehicle comprising control logic capable of:
   receiving a state of a tractor park switch;
   receiving a state of a trailer supply switch;
   receiving a signal indicative of a vehicle operating condition;
   transmitting a signal to a tractor parking brake device to park the tractor and transmitting a signal to a trailer supply device to maintain supply pressure to the trailer and release of the trailer parking brakes in response to the signal indicative of the vehicle operating condition meeting a predetermined operating condition, the tractor park switch being in a second state and the trailer supply switch being in a first state and
   transmitting a signal to a trailer supply device automatically to exhaust the air supply to the trailer in response to the signal indicative of the vehicle operating condition not meeting the predetermined operating condition and the tractor park switch being in a second state.

11. The controller as in claim 10, wherein the signal indicative of the vehicle operating condition comprises at least one of a vehicle speed, an ambient temperature and a foot brake valve status.

12. The controller as in claim 11, wherein the predetermined operating condition comprises at least one of the vehicle speed being about zero, the ambient temperature being less than a predetermined ambient temperature, and the foot brake valve being actuated by an operator.

13. The controller as in claim 10, wherein the signal indicative of the state of the trailer supply switch indicates the trailer supply switch was moved to the first state at least two times prior to the signal indicative of the state of the tractor park switch indicating the tractor park switch was moved to the second state.

14. The controller as in claim 13, wherein the second state of the tractor park switch is different than the first state of the trailer supply switch.

15. The controller as in claim 10, wherein control logic transmits a signal to the trailer supply valve to exhaust the trailer supply valve in response to the trailer supply switch being moved to a first state.

16. The controller as in claim 10, wherein the control logic is further capable of transmitting a signal indicative of the tractor being parked and the trailer air supply being maintained.

17. The controller as in claim 10, wherein the control logic transmits a signal to the trailer supply device to apply the trailer parking brakes in response to the trailer supply switch being moved to the second state.

18. A system for parking brake control for a vehicle comprising:
   a tractor park switch;
   a trailer supply switch;
   a tractor parking brake device;
   a trailer supply device;
   a controller, the controller comprising:
      a first input for the receiving a state of the tractor park switch;
      a second input for receiving a state of the trailer supply switch;
      a communications input for receiving a signal indicative of a vehicle operating condition; and
      control logic, the control logic capable of:
         receiving a state of the tractor park switch;
         receiving a state of the trailer supply switch;
         receiving a vehicle operating condition;
         transmitting a control signal to the tractor parking brake device to park the tractor and transmitting a control signal to the trailer supply device to maintain the air supply to the trailer and release of the trailer parking brakes in response to the vehicle operating condition meeting a predetermined operating condition, the tractor park switch being in a second state and the trailer supply switch being in a first state; and transmitting a control signal to a trailer supply device to exhaust the air supply to the trailer in response to the vehicle operating condition not meeting the predetermined operating condition and the tractor park switch being in a second state.

19. The system as in claim 18, wherein the tractor park switch and the trailer supply switch are three state switches.

20. The system as in claim 19, wherein a second state of the tractor park switch is different than a first state of the trailer supply switch.

21. The system as in claim 18, wherein the signal indicative of vehicle operating condition comprises at least one of vehicle speed, an ambient temperature, an inclination of the vehicle, a temperature of the trailer brakes and a foot brake valve actuation.

22. The system as in claim 18, wherein the vehicle operating condition not meeting the predetermined operating condition is the vehicle speed being greater than a predetermined speed.

23. The system as in claim 18, further comprising a pressure input for receiving a supply pressure value from the trailer air supply device, wherein the control logic is capable of transmitting a signal to the trailer air supply device to exhaust the trailer air supply to park the trailer in response to a supply pressure at the trailer supply valve being less than a predetermined pressure.

24. A method of maintaining a trailer air supply comprising:

actuating a trailer supply switch to transmit a signal indicative of a request to maintain the trailer parking brake in a released state;

actuating a tractor park switch to transmit a signal indicative of a request to park a tractor subsequent to the actuation of the trailer supply switch;

maintaining a trailer air supply such that the trailer parking brakes are released and parking the tractor in response actuating the trailer supply switch prior to actuating the tractor park switch; and evacuating the trailer air supply such that the trailer parking brake are applied automatically in response to the trailer supply switch not being activated prior to the tractor parking switch being activated.

25. The method as in claim 24, further comprising: receiving a signal indicative of a vehicle operating condition and maintaining the trailer air supply in response to the signal indicative of the vehicle operating condition meeting a predetermined condition.

26. The method as in claim 25, wherein the signal indicative of the vehicle operating condition comprises at least one of vehicle speed, ambient temperature, inclination of the vehicle, temperature of the trailer brakes and foot brake valve actuation.

27. The method as in claim 24, wherein the actuating the trailer supply switch comprises pushing in the trailer supply switch at least two times.

28. The method as in claim 24, wherein actuating the tractor park switch comprises pulling out the trailer supply switch.

29. The method as in claim 24, further comprising: recording the actuation of the tractor park switch and the actuation of the trailer supply switch.

30. The method as in claim 24, further comprising indicating the maintaining of the trailer air supply to a vehicle operator.

31. The method as in claim 24, further comprising receiving a signal indicative of a supply pressure to the trailer and applying the trailer parking brakes in response to the supply pressure being less than a predetermined pressure.

32. A system for maintaining a trailer air supply comprising:

means for generating a signal indicative of an operator's intent to supply air to the trailer;

means for generating a signal indicative of an operator's intent to park a tractor;

means for parking the tractor;

means for supplying air to the trailer; and a controller comprising control logic, the control logic capable of:

receiving a signal indicative of a vehicle operating condition;

transmitting a control signal to the means for parking the tractor in response to the signal indicative of the operator's intent to park the tractor;

transmitting a control signal to the means for supplying air to the trailer to maintain the trailer air supply to release the trailer parking brakes in response to receiving the signal indicative of the operator's intent to park the tractor subsequent to receiving the signal indicative of the operator's intent to supply air to the trailer and receiving the signal indicative of the vehicle operating condition meeting a predetermined operating condition; and transmitting a control signal to the means for supply air to the trailer automatically to evacuate the trailer air supply to park the trailer in response to the signal indicative of the operator's intent to supply air to the trailer not being received prior to the signal indicative of the operator's intent to park the tractor.

* * * * *